(12) United States Patent
Van Zanten et al.

(10) Patent No.: US 9,051,480 B2
(45) Date of Patent: Jun. 9, 2015

(54) FUNCTIONAL SURFACE FINISH AND METHOD OF ITS APPLICATION TO A MATERIAL SURFACE

(75) Inventors: Joyce Van Zanten, Waalre (NL); Antonius Hendrikus Luiken, Wierde (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 1473 days.

(21) Appl. No.: 12/374,471

(22) PCT Filed: Jul. 23, 2007

(86) PCT No.: PCT/NL2007/050365
§ 371 (c)(1),
(2), (4) Date: Apr. 11, 2009

(87) PCT Pub. No.: WO2008/013449
PCT Pub. Date: Jan. 31, 2008

(65) Prior Publication Data
US 2009/0318045 A1    Dec. 24, 2009

(30) Foreign Application Priority Data
Jul. 24, 2006  (EP) .................................. 06076464

(51) Int. Cl.
| | |
|---|---|
| B32B 27/12 | (2006.01) |
| C08G 18/58 | (2006.01) |
| C08G 77/38 | (2006.01) |
| B05D 1/36 | (2006.01) |
| C09D 5/16 | (2006.01) |
| B05D 5/00 | (2006.01) |
| B05D 7/00 | (2006.01) |
| B05D 3/02 | (2006.01) |

(52) U.S. Cl.
CPC ................ C09D 5/1662 (2013.01); *B05D 1/36* (2013.01); *B05D 3/02* (2013.01); B05D 5/00 (2013.01); *B05D 7/52* (2013.01)

(58) Field of Classification Search
USPC .......................................................... 442/59
See application file for complete search history.

(56) References Cited

U.S. PATENT DOCUMENTS

| 5,641,856 A | 6/1997 | Meurs |
| 2003/0218130 A1 | 11/2003 | Boschetti et al. |

FOREIGN PATENT DOCUMENTS

WO    WO 2004/076567    9/2004

*Primary Examiner* — Lynda Salvatore
(74) *Attorney, Agent, or Firm* — Swanson & Bratschun, L.L.C.

(57) ABSTRACT

The present invention relates to a functional surface finish comprising a finishing agent having a functional part and a surface-anchoring part, wherein said functional part and said surface-anchoring part are coupled via a thermally reversible covalent bond. The present invention further relates to compositions for finishing a surface, to methods of finishing a material surface, to material surface comprising a surface finish and to a method of re-functionalizing a material surface.

15 Claims, 1 Drawing Sheet

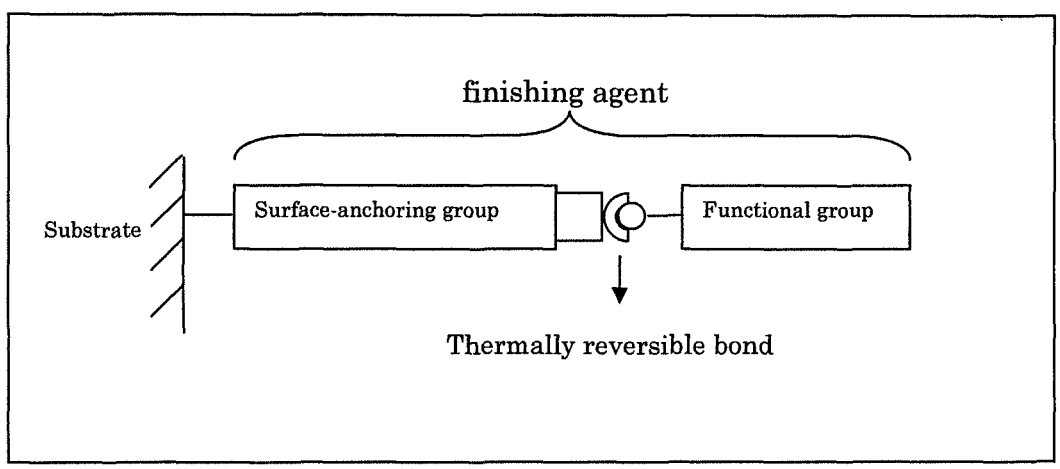

FUNCTIONAL SURFACE FINISH AND METHOD OF ITS APPLICATION TO A MATERIAL SURFACE

RELATED APPLICATIONS

This application is a 35 U.S.C. §371 national phase application of PCT/NL2007/050365 (WO 2008/013449), filed on Jul. 23, 2007, entitled "Functional Surface Finish and Method of its Application to a Material Surface", which application claims the benefit of European Application No. 06076464.4, filed Jul. 24, 2006, which is incorporated herein by reference in its entirety.

The present invention relates to chemical surface modifications. In particular the present invention relates to a functional surface finish, to compositions for finishing a surface, to methods of finishing a material surface, to material surface comprising a surface finish and to a method of re-functionalizing a material surface.

Surface modification aims to tailor the surface characteristics of a material for a specific application without detrimentally affecting the bulk properties. At present a range of biological, physical, and chemical methods are used to effect surface modifications on a wide range of materials, including biomedical devices and biomaterials, wood, textiles, leather, metals, glass, ceramics, paper and plastics.

Such finishes may for instance include wettability, water-repellent and waterproofing finishes; coloration, lacquering, and abrasion protection finishes; chemical softening, easy-care, antistatic and soil-release finishes; flame-retarding finishes; and anti-microbial, rotproofing and hygiene finishes. For instance textiles are often provided with fire or flame retarding finishes. The finish itself is the chemical substance provided bonded to the surface by mechanical or chemical interaction.

The application of these finishes requires a specific application process and is tailored to the material processed. In fact, the finishing process requires a careful balance between the compatibility of different finishing products with the material and treatments and the application processes used to provide that material with desirable properties. For instance in the field of textile finishes, such parameters as fiber nature (100% natural, synthetic or blends thereof) and inherent absorbent properties as well as weave and construction of a textile fabric, largely determine the possibility of subjecting the material to a wet finish process.

One general problem with product finishes, and one that is most notable in textiles, is that the desired material properties diminish by care and maintenance of the material since washing results in partial removal of the finish and will gradually reduce the functionality. Yet, the processes for applying these product finishes are so specialized that they do not allow for a re-application of the finish by for instance a decentralized laundry or private person. It would however be desirable to be able to restore the functional surface properties, such as water-repellency or flame retardancy, of a material by an easy process. Thus in for instance textile processing, there is needed a process which involves no sophisticated equipment or intricate procedures.

A reverse situation, where an easy removal of the finish is required, may also be desirable, such as for instance in some finishes for wood. Protecting lumber against weather conditions and enhancing its lifespan involves the provision of barrier functions (water repellency), flame retardancy, anti-rot functionality and insect resistance. These treatments are essential and are mostly applied discontinuously (i.e. once only, for instance prior to retail sale). Also, they involve hazardous chemicals. On the one hand there is needed a process by which functional chemicals can be applied continuously (i.e. involving periodic re-application) and in a water-based process. On the other hand there is needed a process for easy removal of the biohazardous chemicals, so that the remaining material may be disposed of much cheaper, in stead of as chemical waste, or be re-used for a different purpose.

Thus, there is a need for a surface finishing process for providing materials such as textiles with a permanent, yet easily re-applicable finish that provides the material, and particularly its surface with desirable properties. Also there is needed a functional finish which can be removed without great difficulty, while allowing the material to maintain all other properties.

The present inventors have found that a reversible finishing can be provided to mostly any material surface by treating that surface with a finishing agent comprising a surface-anchoring group and a functional group, wherein said two groups are linked by a thermally reversible binding system.

In a first aspect, the present invention relates to a surface finish, comprising a finishing agent having a functional part and a surface-anchoring part, wherein said functional part and said surface-anchoring part are coupled via a thermally reversible covalent bond. The surface-anchoring part anchors the agent to the surface, while the surface is provided with functionality as a result of the tethered functional part (See FIG. 1). The finish may comprise from 0.1-100% of the finishing agent. The amount of finishing agent in the finish depends, as a skilled person will understand, on the application method, type of finishing agent, requirements imposed on the finish, etc.

In a preferred embodiment of a surface finish according to the invention, the functional part comprises a functional moiety and a first covalent binding moiety, and the surface-anchoring part comprises a surface-anchoring moiety and a second covalent binding moiety, wherein the first and second covalent binding moieties together form the thermally reversible covalent bond at a temperature T1 while they form no covalent bond at a temperature T2, wherein T1 is lower than T2, and wherein more covalent bonds are formed between the moieties at T1 than at T2.

The covalent bond can be formed in an equilibrium reaction, so that, also, a part of the bonds has been formed at T1 and a part of the bonds has been broken at T2. It is essential, however, that (many) more bonds are formed at T1 than at T2. The temperature T1 and temperature T2 are suitably 0-250° C. and preferably 5-150° C., with T1 being lower than T2. Preferably, at T1, at least 5% of the reversible covalent binding moieties have formed a covalent bond. Still more preferably, at T1, at least 50% of the covalent binding moieties have formed a covalent bond. It will be clear that, preferably, the total amount of the first covalent binding moieties and the total amount of the second covalent binding moieties are essentially in the proportion of 1:1.

A highly preferred range of values for temperature T1 is for instance between 5-60° C. For instance, T1 may be 15, 25, 35 or 45° C. Temperature T2 is preferably above 75° C., for instance 80, 90, 100, 110, 120, 130, or 140° C. or higher.

The covalent binding moieties of both parts of the finishing agent that together form the covalent bond may be identical covalent binding moieties or they may differ from each other. In most instances they will constitute complementary reactive groups that upon engaging in the thermally reversible reaction, form the thermally reversible covalent bond.

The reversible covalent bond between the covalent binding moieties can be brought about by means of different types of thermally reversible reactions.

In preferred embodiment, the first and second covalent binding moieties are selected from diene groups and dienophile groups.

In an even more preferred embodiment, the thermally reversible covalent bond may be brought about by means of a thermally reversible reaction referred to as a Diels-Alder reaction. Examples of suitable Diels-Alder reactions that may be used in aspects of the present invention are for instance Diels-Alder cycloaddition reactions, nitroso dimerization reactions, cyclic anhydride reactions in which ester bonds are formed, reactions in which urethane formation takes place, and reactions in which azlactone-phenol adduct formation takes place, Schiffs base reactions from which an imide is formed and wherein no reduction takes place (thereby providing for a reversible bond), and the 'nitroxide mediated reaction' (e.g. TEMPO [2,2,6,6-tetramethylpiperidinyloxy]. A condition is that the reaction chosen from this group is thermally reversible. For a further description of these reactions, reference is made to J. Macromol. Sci. Rev. Macromol. Chem. C33 (3), 1993, pp. 239-257.

In a highly preferred embodiment, the thermally reversible covalent bond is brought about by means of a Diels-Alder cycloaddition reaction.

The first covalent binding moieties are preferably selected from acrylates, methacrylates, furane, anthracene, thiophene and pyrrole groups and combinations thereof, preferably furan groups The second covalent binding moieties are preferably selected from maleimide, maleic anhydride, fumarate, maleate and alkyne groups and combinations thereof, preferably maleimide groups.

It should be understood that the first covalent binding moiety may also be selected from maleimide, maleic anhydride, fumarate, maleate and alkyne groups. However in that event, the covalent binding moieties are selected from acrylates, methacrylates, furane, anthracene, thiophene and pyrrole groups in order to be able to form a covalent bond with the first covalent binding moiety.

The surface-anchoring moiety as part of the surface-anchoring part of the finishing agent of the present invention may be any molecule capable of providing adhesion or fixation to the material surface to which the finish is to be applied. The skilled person will understand that the surface-anchoring moiety will therefore strongly depend on the surface chemistry of the material to which the finish is to be applied. For instance, in the case of textile applications skilled persons can think of hydroxyl, carboxyl or amine groups. For wood applications hydroxyl groups are present to react with the surface-anchoring group. In the case of glass, metal and ceramics also hydroxyl groups are present. If there aren't any suitable reactive groups available on the substrate surface for the reaction with the surface-anchoring group one can think of coating the substrate surface with epoxy, urethane, alkoxysilane, alkoxytitane or one of the above mentioned above for textile applications. In some preferred embodiments the anchoring moiety is an epoxy moiety, a hydroxyl moiety, a carboxyl moiety, an amine moiety, a hydrazide moiety, an amide moiety or an aldehyde moiety. The anchoring moiety is preferably selected from an epoxy, hydroxyl, carboxyl or amine moiety.

The functional moiety as part of the functional part of the finishing agent may be any molecule that provides the finish with dye-properties, crease resistant/easy care properties, waterproofing, hydrophobic, water-repellent, soil and stain releasing, flame retarding, hydrophilic, antistatic, oil absorbing, and/or antimicrobial functionality. The skilled person is well aware of the various chemical groups that can be used to provide these functionalities.

The functional group may suitably be an alkyl group. Alkyl groups may provide waterproofing or water-repellency to the finish. The alkyl group may be a branched or straight chain, saturated or unsaturated alkyl group. Preferably the alkyl is a straight chain having from 2 to 50 carbon atoms, most preferably $C_4$-$C_{20}$.

Alternatively, the functional group may for instance be a halo(hydro)carbon, such as a fluorocarbon or a fluorohydrocarbon in order to provide hydrophobic character and soil and stain release properties to the finish.

In another embodiment, the functional group may for instance be an oligo- or (poly)siloxane in order to provide hydrophobic, anti-stick or soft-touch character.

In another embodiment, the functional group may for instance be a phosphorous or nitrogen or bromine or chlorine-containing compound in order to provide flame retardancy to the finish. Flame retardancy can be accomplished by the provision of a functional group comprising a complex organophosphorous compound such as Tetrakis (hydroxymethyl) phosphonium chloride (THPC), brominated flame retardants (BFRs), such as polybromobiphenyl (PBB), polybrominated diphenylethers (PBDEs), polybrominated biphenyls (PBBs), and tetrabromobisphenol A (TBBPA), or fluorinated flame retardants (FFRs), in general perfluoroorganic compounds (e.g., perfluorooctane sulfonate—PFOS), or flame retarding polymers or copolymers such as polyvinylchloride, polyvinylidenechloride, or polymer combinations with antimonum trioxide.

In yet another embodiment, the functional group may for instance be a hydrophilic polymer such as polyethylene glycol or poly vinyl alcohol, in order to provide hydrophilic and antistatic properties.

In still another embodiment, the functional group may for instance be an olefin, such as a polypropylene in order to provide oil-absorbing properties.

In stead of providing the finishing agent with a single functionality, the skilled person will appreciate that the finishing agent may be provided with multiple functionalities for instance by using bi or trifurcating elements between the reversible covalent binding moiety and the functional moieties. Thus, combinations of functionalities may be provided by combining various functional groups into one molecule. Alternatively, one may apply different molecules to the surface, each providing a different functionality. Also, functional groups may be used that provide a combined functionality in a single molecule such as polychlorinated-n-alkanes (PCAs) (e.g. Short-chain chlorinated paraffins (SCCPs) with up to 30 carbon atoms and a chlorine content of 30 to 70% by mass, which are known to improve water repellent and flame retardant properties.

In preferred embodiments the functional moiety is selected from the group consisting of alkyl groups, halo(hydro)carbon groups, (organo)phosphorous compounds, bromine and chlorine-containing compounds, flame retarding polymers and copolymers, hydrophilic polymers and olefins. More preferably, the functional moiety is selected from the group consisting of alkyl groups, preferably $C_4$-$C_{20}$ alkyl groups, fluorocarbons, polyethylene glycol, and polypropylene.

In still another aspect, the present invention provides a composition for finishing a surface, comprising a finishing agent as described above, wherein said functional part and a surface-anchoring part are coupled. Alternatively, the present invention provides a composition for finishing a surface, comprising only the surface-anchoring part of a finishing agent as described above. Also, the present invention provides such a composition comprising only the functional part of a finishing agent as described above. An advantage of these separate compositions is that for instance the surface-anchoring part of a finishing agent may be provided as a basic functionality on the material surface by the factory, while the customer may use only the functional part of a finishing agent in order to re-apply the finish after it has weared off, such as indicated in a method of re-functionalizing a material surface described herein below. Conveniently, the two separate compositions may be provided in a kit of parts for finishing a surface, comprising a finishing agent as described above, wherein said functional part and a surface-anchoring part are provided as separate compositions.

In yet another aspect, the present invention provides a method of finishing a material surface comprising contacting a material surface with a composition according to the present invention. The contact should be of such nature and of sufficient duration to allow for the anchoring moiety in the anchoring part of the agent to react with the complementary reactive group on the surface. A suitable contact time may for instance encompass a period of for instance about 1 minute to about 1 day after which the solvent may then be allowed to evaporate or may be rinsed of with for instance water. This provides the finish to the surface and provides the surface with the required functionality.

The material surface to which a finish according to the present invention is applied may be wood, textile (including its basic materials hair, cotton, silk, wool, polyester or polyamide), leather, metal, alloy, glass, ceramic, stone, concrete, paper, rubber, silicates (clay), plastic (synthetic polymeric material) or any other material that requires a finish according to the present invention. It should be understood that the finish may not only be provided upon the visible surface, but may penetrate into the substrate material, depending on the material surface characteristics. For instance, it may be more freely absorbed by wood or textile, penetrating deeper into the wood or textile fibre, thereby presenting a thicker covering and thus providing enhanced functionality in some cases.

The finish may be applied by bringing the finish agent (for instance in the form wherein the anchoring group is covalently bonded to the functional group) into contact with the material surface. The anchoring group will fix the finishing agent to the material's surface, while the functional group will provide the surface with the desired functionality, thus providing the material surface with the finish.

Alternatively, the finish may be applied to a material's surface by first bringing the surface-anchoring part with an unreacted covalent binding moiety into contact with the material's surface and allowing the surface-anchoring moiety to attach to the material's surface. Next, the material surface having fixed thereto the surface-anchoring part of the finishing agent is brought into contact with the functional part having the second unreacted covalent binding moiety at a temperature at which said first and second covalent binding moieties form a covalent bond (i.e. at a temperature T1). Thus, in one embodiment, the present invention provides a method of finishing a material surface as described above, wherein the material surface is first coated with the surface-anchoring part and subsequently with the functional part of the finishing agent of the present invention.

The compositions of the present invention may be applied to a suitable material surface by any method available, including but not limited to spraying, dipping, brushing, rolling, knife coating, polishing, padding, impregnating, immersion coating and printing. The compositions may be applied directly, or, alternatively, the composition may be dissolved or dispersed in a solvent and then applied to the material surface. The application may occur by a wet process (including a solvent) or may occur by a dry process. The finish according to the invention may be applied to the material surface in the form of a solution, dispersion or emulsion. Alternatively, the finish may be applied in powdered form.

Suitable amounts of compositions used for reversible functional finishing a material surface are 0.1-1000 $g/m^2$, more preferably 0.1-100 $g/m^2$ of material surface based on the weight of the finishing agent.

Preferably, in a method of finishing a material surface according to the present invention, the thermally reversible reaction is a Diels-Alder cycloaddition reaction.

The present invention also relates to a material surface obtainable by a method according to the present invention finishing a material surface as described above.

The present invention also relates to a material surface comprising a surface finish according to the present invention, comprising a finishing agent having a functional part and a surface-anchoring part, wherein said functional part and said surface-anchoring part are coupled via a thermally reversible covalent bond. Such finishes may for instance include wettability, water-repellent and waterproofing finishes; coloration, lacquering, and abrasion protection finishes; chemical softening, easy-care, antistatic and soil-release finishes; flame-retarding finishes; and anti-microbial, rotproofing and hygiene finishes.

The present invention also relates to a method of re-functionalizing a material surface comprising a surface finish according to the present invention as described above, said method comprising the steps of:

a) raising the temperature of said surface finish to a temperature T2 as described above;

b) removing said functional part from said surface, and c) contacting the material surface obtained in step b) with a composition comprising only the functional part of a finishing agent as described above before, during or after lowering the temperature of said material surface obtained in step b) to a temperature T1 as described above.

The raising of the temperature of said surface finish to a temperature T2, whereby said thermally reversible covalent bond is not formed, is performed in order to separate the functional part from the surface-anchoring part. By bringing the temperature of the finish above the temperature at which the covalent binding moieties in the finishing agent form a covalent bond, the finish will loose its functional group together with the second covalent binding moiety, while the first covalent binding moiety is still held at the surface of the material by the anchoring group. Thus, at such an elevated temperature, it is possible to wholly or partly remove from the object the functionality-providing part of the finish.

The step of removing the separated functional part from the surface is meant to provide a de-functionalized material surface comprising the surface-anchoring parts having only the second covalent binding moieties. This removal may be performed together with the step of raising the temperature, for instance by blowing hot air over the surface, as a result of which the functional parts will "debond" or "dis-connect". Alternatively hot water or steam or any other solvent may be used to remove the functional part from the material surface when the temperature is above T2.

The step of re-functionalizing the de-functionalized material surface comprises contacting the de-functionalized material surface with a composition comprising functional parts having covalent binding moieties capable of forming a thermally reversible covalent bond with the second covalent binding moieties at a temperature T1 but not at a temperature T2, wherein T1 is lower than T2, and wherein more covalent bonds are formed between the moieties at T1 than at T2, wherein the contacting is performed under conditions which allow for the formation of a thermally reversible covalent bond between said first covalent binding moiety and said second covalent binding moiety. This may suitably be performed by providing the functional part in a solvent, contacting the solution to the de-functionalized surface, and allowing the first covalent binding moiety to react with the second covalent binding moiety of the anchoring part which is still on the de-functionalized surface, for instance by allowing contact for a period of 1 minute to about 1 day at a temperature T1. Thereafter, the unreacted functional part and solvent may be removed, e.g. by rinsing with water, which again provides the finish to the surface and restores the desired functionality.

Finishes according to the present invention may be used on surfaces including biomedical devices and biomaterials. It may be used on textiles to make them wrinkle resistant, shrink free, rot free, antistatic, odor-resistant, moth-resist, soil- and stain-resist, and anti-yellowing.

The present invention also provides graffiti-resistant treatments for outdoor surfaces or makes it easy to remove graffiti there from. For instance, a hot-air, hot-water or steam treatment may be used to remove the functional part of the finish, upon which a composition with a new functional part can be simply applied to the surface to re-functionalize it.

The place where the methods of the present invention may be carried out are for instance central laundries and commercial laundry equipment facilities in apartments, residence halls, condominiums, cooperatives, hotels, motels, military installations, campgrounds, RV parks, senior citizen residences, truck stops and marinas. The present invention will now be exemplified in the following examples.

EXAMPLES

Example 1

As an Example, the method of the present invention may be performed as follows:
Re-Applying a Functional Finish to a Surface.

A finishing agent according to the invention may be prepared by mixing a suitable amount of a suitable functional part having a functional moiety and a first covalent binding moiety, and a suitable amount of a suitable anchoring part having an anchoring moiety and a second covalent binding moiety in a suitable solvent to provide a composition of the finishing agent, wherein the functionality of the functional part will provide a surface with the desired functionality.

The surface of a material may be contacted with the composition of the finishing agent prepared as described above at a suitable temperature T1. The anchoring moiety is then allowed to react with the complementary reactive group on the surface for a suitable period of time and the unreacted agent and solvent may then be is rinsed of with water. This provides the finish to the surface and provides the surface with the desired functionally.

To remove the finish, the surface may be exposed to a suitable temperature T2. As a result, the bond between the anchoring part and the functional part is broken. The functional part may then be removed from the surface by a suitable removing process.

Subsequently, the material surface may be contacted with a composition comprising the functional part of the finishing agent consisting of a suitable amount of a suitable functional part having a functional moiety and a first covalent binding moiety as described above, in a similar suitable solvent. Next, the first covalent binding moiety is then allowed to react with the second covalent binding moiety of the anchoring part which is still on the surface, for a suitable period of time at a suitable temperature T1, and the unreacted functional part and solvent may then be rinsed of with water. This again provides the finish to the surface and restores the functionality to the surface.

Example 2

A finishing agent according to the invention was prepared by reaction of 5.5 gram of mono-epoxy-polypropylene (Baker Petrolite), with 0.3 gram furfurylamine (Sigma-Aldrich) in 150 mL dichloromethane at 50° C. to obtain a functional part having a functional moiety and first covalent binding moiety.

The anchoring part having anchoring moiety and second covalent binding moiety was attached to the hydroxyl groups of the cotton (fabric) by reaction of furoic acid (Sigma-Aldrich) in THF (tetrahydrofuran) (commercially available from Biosolve) at room temperature in the presence of a small amount of hydrochloric acid as the catalyst to improve the esterfication reaction.

The covalent binding moiety of the surface of the fabric was contacted with the composition of the finishing agent prepared as described above at a temperature of 40° C. The covalent binding moiety on the surface of the fabric was then allowed to react with the covalent binding moiety of the finishing agent for a period of 240 minutes and the unreacted agent and solvent were then rinsed off with ethanol. This attached the finish to the surface and provided the surface with hydrophobicity.

To remove the finish, the surface was exposed to a temperature of 100° C., which resulted in breaking of the bonds between the anchoring part and the functional part.

The functional part was then removed from the surface by washing with ethanol. The remaining fabric remained functionalized with the anchoring part was thereafter receptive of a new functionality.
Synthesis of Anchoring Group was Performed as Follows.

Dried fabric was brought into contact with dry dichloromethane containing 20 weight percent of 1,6-diisocyanatohexane (Sigma-Aldrich). After a period or 48 hours at 50° C., the fabric was washed with dry dichloromethane to remove unreacted 1,6-diisocyanatohexane. The treated fabric was subsequently treated with hydroxyethylmaleimide (synthesized as described below) under dry conditions at 50° C. for 8 hours.
Synthesis of Hydroxyethylmaleimide was Performed as Follows:

100 gram of Maleic anhydride and 85 gram of furan were dissolved in 120 gram of ethylacetate at room temperature until a white precipitate was formed. After filtration, 40 gram of the white product was dissolved in 55 mL ethanol after which 17 gram of 2-aminoethanol dissolved in 13 mL of ethanol was added dropwise to the solution. After addition the temperature was raised to 85° C. and the mixture was allowed to react for 45 minutes. After cooling down a white precipitate was formed. 15 gram of this product was dissolved in 150 gram of xylene, under nitrogen atmosphere and reflux conditions, the furan was decoupled from the product.

Example 3

Re-Applying a Hydrophobic/Waterproofing Finish to Cotton
A finishing agent according to the invention was prepared by reaction of 91 wt. % of mono-(2,3-Epoxy)Propylether Terminated Polydimethylsiloxane (Gelest, Inc.) with 0.9 wt. % of furfurylamine (Sigma-Aldrich) in THF at room temperature to obtain a functional part having functional moiety and first covalent binding moiety. The anchoring part having anchoring moiety and second covalent binding moiety were attached to the hydroxyl groups of the cotton by reaction of 100% wt 4-(Maleinimido)phenyl isocyanate (Sigma-Aldrich) in THF at room temperature to provide a cotton surface with a covalent binding moiety.

The covalent binding moiety of the surface of cotton was contacted with the composition of the finishing agent prepared as described above at a a temperature of 40° C. The covalent binding moiety of the cotton surface was then allowed to react with the covalent binding moiety of the finishing agent for a period of for instance 240 minutes and the unreacted agent and solvent was then rinsed off with ethanol. This attached the finish to the surface and provided the surface with hydrophobicity.

To remove the finish, the surface was exposed to a temperature of 100° C. which resulted in breaking of the bond between anchoring part and functional part. The functional part may then be removed from the surface by washing with ethanol.

Subsequently, the material surface was contacted with a composition comprising the functional part of the finishing agent consisting of 91 wt. % of mono-(2,3-Epoxy)Propylether Terminated Polydimethylsiloxane (Gelest, Inc.) with 0.9 wt. % of furfurylamine in THF prepared as described above. Next, the first covalent binding moiety was allowed to react with the second covalent binding moiety of the anchoring part which was still on the surface, for a period of 240 minutes at a temperature of 40° C., and the unreacted functional part and solvent were be rinsed off with ethanol. This again attached the finish to the surface and restored the hydrophobicity to the surface.

The invention claimed is:

1. A surface finish, comprising a finishing agent having a functional part and a surface-anchoring part, wherein said functional part comprises a functional moiety and a first covalent binding moiety, and wherein said surface-anchoring part comprises a surface-anchoring moiety for binding said surface-anchoring part to a material surface and a second covalent binding moiety, and wherein said first and second covalent binding moieties together form a thermally reversible covalent bond at a temperature T1 while they form no covalent bond at a temperature T2, wherein T1 is lower than T2, and wherein, when said functional part and said surface-anchoring part are coupled via said thermally reversible covalent bond and are bonded to a material surface through said surface-anchoring part, said functional part is removable from said material surface by breaking the thermally reversible covalent bond above a temperature T2, whereby said second covalent binding moiety continues to be bonded to the material surface by said surface-anchoring moiety.

2. A finish according to claim 1, wherein said first and second covalent binding moieties are selected from diene groups and dienophile groups, such that one of the covalent binding moieties has a diene group and the other has a dienophile group.

3. A finish according to claim 1, wherein said thermally reversible covalent bond is brought about by means of a thermally reversible Diels-Alder reaction.

4. A finish according to claim 1, wherein said thermally reversible covalent bond is brought about by means of a Diels-Alder cycloaddition reaction.

5. A finish according to claim 1, wherein said first covalent binding moieties are selected from acrylates, methacrylates, furane, anthracene, thiophene, and pyrrole groups and combinations thereof, and wherein said second covalent binding moieties are selected from maleimide, maleic anhydride, fumarate, maleate, and alkyne groups and combinations thereof.

6. A finish according to claim 1, wherein said anchoring moiety is an epoxy, hydroxyl, carboxyl, amine, urethane, hydrazide, amide, alkoxysilane, alkoxytitane (titanate), or aldehyde moiety.

7. A finish according to claim 1, wherein said functional moiety represents a molecule that provides said finish with dye-properties, crease resistant/easy care, anti-graffiti, waterproofing, hydrophobic, water-repellent, soil and/or stain releasing, flame retarding, hydrophilic, antistatic, oil absorbing, hygienic and/or antimicrobial functionality.

8. A finish according to claim 1, wherein said functional moiety is selected from the group consisting of alkyl groups, oligosiloxane, polysiloxane, halo(hydro)carbon groups, (organo)phosphorous compounds, bromine-containing compounds, chlorine-containing compounds, flame retarding polymers, flame retarding copolymers, hydrophilic polymers, and olefins.

9. A finish according to claim 1, wherein said functional moiety is selected from the group consisting of alkyl groups, oligo- and polysiloxanes, fluorocarbons, polyethylene glycol, and polypropylene.

10. A composition for finishing a surface comprising a finishing agent as defined in claim 1, wherein said functional part and a surface-anchoring part are coupled.

11. A composition for finishing a surface, comprising the surface-anchoring part of a finishing agent as defined in claim 1.

12. A composition for finishing a surface, comprising the functional part of a finishing agent as defined in claim 1.

13. A material surface comprising a surface finish as defined in claim 1.

14. A finish according to claim 3, wherein the Diels-Alder reaction is selected from the group consisting of Diels-Alder cycloaddition reactions, nitroso dimerization reactions, cyclic anhydride reactions in which ester bonds are formed, reactions in which urethane formation takes place, reactions in which azlactone-phenol adduct formation takes place, Schiff's base reactions from which an imide is formed and wherein no reduction takes place (thereby providing for a reversible bond), and a nitroxide mediated reaction.

15. A finish according to claim 1, wherein, when said functional part and said surface-anchoring part are coupled via said thermally reversible covalent bond and are bonded to a material surface through said surface-anchoring part, said functional part is removable from said material surface by breaking the thermally reversible covalent bond above a temperature T2, whereby said second covalent binding moiety continues to be bonded to the material surface by said surface-anchoring moiety, and wherein when said functional part is removed from said material surface to thereby render a de-functionalized material surface, said de-functionalized material surface can be re-functionalized by contacting the de-functionalized material surface with a composition comprising a second functional part having a third covalent binding moiety capable of forming a thermally reversible covalent bond with said second covalent binding moiety at the material surface at a temperature T3 but not at a temperature T4, wherein T3 is lower than T4, wherein the contacting is performed under conditions which allow for the formation of a thermally reversible covalent bond between said third covalent binding moiety and said second covalent binding moiety.

* * * * *